(12) United States Patent
Cohen et al.

(10) Patent No.: US 12,108,510 B2
(45) Date of Patent: Oct. 1, 2024

(54) SMART ELECTRIC SOCKETS

(71) Applicants: S.B.I.D Solutions, Enterprise and Investments Ltd., Ashkelon (IL); Shemon Cohen, Ashkelon (IL)

(72) Inventors: Shemon Cohen, Ashkelon (IL); Itamar Cohen, Ashkelon (IL)

(73) Assignee: S.B.I.D Solutions, Enterprise and Investments Ltd., Ashkelon (IL)

( * ) Notice: Subject to any disclaimer, the term of this patent is extended or adjusted under 35 U.S.C. 154(b) by 172 days.

(21) Appl. No.: 17/603,958

(22) PCT Filed: Apr. 7, 2020

(86) PCT No.: PCT/IL2020/050423
§ 371 (c)(1),
(2) Date: Oct. 15, 2021

(87) PCT Pub. No.: WO2020/212975
PCT Pub. Date: Oct. 22, 2020

(65) Prior Publication Data
US 2022/0210894 A1 Jun. 30, 2022

(30) Foreign Application Priority Data
Apr. 15, 2019 (IL) .......................................... 266055

(51) Int. Cl.
*H05B 47/17* (2020.01)
*H04L 12/28* (2006.01)
(Continued)

(52) U.S. Cl.
CPC ........... *H05B 47/17* (2020.01); *H04L 12/282* (2013.01); *H04L 12/2827* (2013.01);
(Continued)

(58) Field of Classification Search
CPC ....................................................... H05B 47/17
(Continued)

(56) References Cited

U.S. PATENT DOCUMENTS 9,321,623 B2    4/2016  Raoven et al.
2002/0097546 A1  7/2002  Weinberger
(Continued)

FOREIGN PATENT DOCUMENTS

CN   203503918   3/2014
CN   106104293   11/2016
(Continued)

OTHER PUBLICATIONS

International Search Report and the Written Opinion Dated Aug. 23, 2020 From the International Searching Authority Re. Application No. PCT/IL2020/050423. (19 Pages).
(Continued)

*Primary Examiner* — Joseph Chang (57) ABSTRACT

A smart socket has an off setting, an on setting, and a manual switch to switch manually between the off setting and the on setting. An automatic switch mode provides for switching automatically between the off setting and the on setting, based on time and/or on sensor input. The socket also has a Sabbath mode, wherein the manual switch is disabled and the automatic switching is based on time or on a predetermined set of sensors, wherein the smart socket is configured to enter the Sabbath mode based on Sabbaths and/or festivals using the Hebrew calendar and locally calculated daylight times.

22 Claims, 5 Drawing Sheets

(51) Int. Cl.
*H05B 47/11* (2020.01)
*H05B 47/115* (2020.01)
*H05B 47/16* (2020.01)
*H05B 47/19* (2020.01)

(52) U.S. Cl.
CPC .......... *H05B 47/11* (2020.01); *H05B 47/115* (2020.01); *H05B 47/16* (2020.01); *H05B 47/19* (2020.01); *H04L 2012/2841* (2013.01)

(58) Field of Classification Search
USPC ....................................................... 307/141
See application file for complete search history.

(56) References Cited

U.S. PATENT DOCUMENTS

| | | | |
|---|---|---|---|
| 2009/0195349 A1* | 8/2009 | Frader-Thompson | ...................... G01D 4/002 340/3.1 |
| 2013/0200725 A1 | 8/2013 | Apelker et al. | |
| 2013/0253725 A1* | 9/2013 | Ezra | ...................... G05B 15/02 700/296 |
| 2014/0090990 A1 | 4/2014 | Richardson | |
| 2014/0191573 A1* | 7/2014 | Chen | ...................... G08C 17/02 29/874 |

FOREIGN PATENT DOCUMENTS

| EP | 1354330 | 10/2003 |
|---|---|---|
| WO | WO 2020/212975 | 10/2020 |

OTHER PUBLICATIONS

Invitation to Pay Additional Fees and Communication Relating to the Partial International Search Dated Jul. 2, 2020 From the International Searching Authority Re. Application No. PCT/IL2020/050423. (4 Pages).
Invitation to Pay Additional Fees Dated Jul. 13, 2021 From the International Preliminary Examining Authority Re. Application No. PCT/IL2020/050423. (2 Pages).
Office Action Dated Nov. 5, 2020 From the Israel Patent Office Re. Application No. 266055. (3 Pages).
Office Action Dated Dec. 29, 2021 From the Israel Patent Office Re. Application No. 266055. (6 Pages).
Machine Translation dated May 1, 2024 of Notification of Office Action Dated Apr. 11, 2024 From the State Intellectual Property Office of the People's Republic of China Re. Application No. 202080043919.2. (6 Pages).
Notification of Office Action Dated Apr. 11, 2024 From the State Intellectual Property Office of the People's Republic of China Re. Application No. 202080043919.2. (7 Pages).
English Summary and Machine Translation Dated Sep. 7, 2023 of Notification of Office Action Dated Aug. 25, 2023 From the State Intellectual Property Office of the People's Republic of China Re. Application No. 202080043919.2. (19 pages).
Notification of Office Action and Search Report Dated Aug. 25, 2023 From the National Intellectual Property Administration of the People's Republic of China Re. Application No. 202080043919.2 and Its Machine Translation Into English. (25 Pages).

* cited by examiner

SMART ELECTRIC SOCKETS

RELATED APPLICATIONS

This application is a National Phase of PCT Patent Application No. PCT/IL2020/050423 having International filing date of Apr. 7, 2020, which claims the benefit of priority of IL Patent Application No. 266,055 filed on Apr. 15, 2019. The contents of the above applications are all incorporated by reference as if fully set forth herein in their entirety.

This application claims the benefit of priority of IL Patent Application No. 266,055 filed on Apr. 15, 2019, the contents of which are incorporated herein by reference in their entirety.

FIELD AND BACKGROUND OF THE INVENTION

The present invention, in some embodiments thereof, relates to a smart electric power socket and a smart control system which controls the socket.

Electrical power sockets that have smart switching and which can communicate over WiFi, ZigBee, or Bluetooth™ to work with a smart building control system are available.

Smart plugs can be used to plug in non-smart devices and allow the smart building control to operate the device as if it were a smart device. A user can contact the smart home control from his mobile telephone for example in order to check that an electric heater or an iron has been switched off or if not, then to switch it off remotely. Some smart plugs may let you check electricity usage so that wasteful devices can be identified, or may let you check how long the attached device has been on. A proximity sensor can contact the smart home control system which can switch on lights as the user approaches.

Smart plugs allow for programmable and timed operation. Thus lights can be programmed to come on at night, and programs can be applied to vary the lighting in the house, say to make an empty house appear occupied. As well as programmable control, voice control is also possible and certain plugs may respond to on or off and more complex commands.

Such smart control poses a problem for observant Jews, who regard electrical switching and direct intentional causation of switching on holy days such as the Sabbath and festivals as forbidden, and there being some debate as to what is considered as direct causation. The use of smart control itself is not a problem, as timetable-based operation is perfectly acceptable, however anything where switching is consequent on a conscious action of the user is undesirable.

The Sabbath observer therefore is happy to have smart control operating on the Sabbath, but seeks a way to avoid them impinging on his Sabbath observance.

Existing smart sockets can be switched onto settings in which they can allow for Sabbath observance, however such solutions suffer from one common disadvantage. The Sabbath observer has to remember to operate or implement the favored solution before the Sabbath starts. In addition, in settings such as hotels, the facilities, even if provided, may be unfamiliar and difficult for the Sabbath observer to set correctly.

The present embodiments address the issue of providing a smart plug that can be used in both the home and in hotels and like commercial settings, and which can be relied upon to control electrical devices without bringing about any infringement of the Sabbath or holy days and without requiring the user to remember to enter the setting or require special expertise.

SUMMARY OF THE INVENTION

A smart plug or socket according to the present embodiments is fully functional according to any standard specification for a smart plug or socket, and is in addition able to determine Sabbath and festival start and end times. During the Sabbath or festival the plug or socket works only in automatic mode via time-switch control, or, if it users sensors, restricts itself to sensors that have nothing to do with human activity, say sensors based on ambient temperature or ambient light.

As well as having a Sabbath mode, a socket according to the present embodiments may have a safety mode. Thus if the conductor within the socket overheats, a feedback system may be used to manage the current and prevent the conductor from reaching dangerous temperatures. If the conductor does reach dangerous temperatures then a cutout may be applied. As well as temperature, current may be measured for dangerous levels. The socket may be rated for given maximum currents and the rated current may be programmable within reasonable and safe limits.

According to an aspect of some embodiments of the present invention there is provided a smart socket comprising:
  an off setting;
  an on setting;
  a manual switch to switch manually between the off setting and the on setting;
  an automatic switch mode to switch automatically between the off setting and the on setting, the automatic switching being based on time and/or on sensor input;
  a Sabbath mode, wherein the manual switch is disabled and the automatic switching is based on time or on a predetermined set of sensors, wherein the smart socket is configured to enter the Sabbath mode based on Sabbaths and/or festivals using the Hebrew calendar and locally calculated daylight times.

An embodiment may comprise a radio transmitter/receiver for a short range radio network.

In an embodiment, the predetermined set of sensors for the Sabbath mode comprises sensors of environmental conditions and excludes sensors that detection human motion or action.

An embodiment may comprise a temperature sensor for sensing temperature within the socket, or of a temperature of a conductor within the socket, thereby to govern temperature within the socket and prevent overheating.

An embodiment may have a first temperature threshold, and a feedback circuit for controlling the current within the plug when the first temperature threshold is exceeded.

An embodiment may have a second temperature threshold, and a cutout for disconnecting current within the socket when the second temperature threshold is exceeded.

An embodiment may comprise a measurement unit for measuring electric current usage.

An embodiment may switch off devices not drawing current as detected by the measurement unit.

An embodiment may comprise a programmable current threshold and a cutoff for disconnecting when the measured electric current usage exceeds the threshold.

The socket may include live, neutral and earth terminals as well as optical detectors to detect a presence of prongs of a plug to engage the terminals. The smart socket may use the optical detectors to allow current flow only if at least two of the terminals are engaged.

The socket may allow current flow only if all three of the terminals are engaged.

The socket may provide a scanning operation within the Sabbath mode wherein the optical detectors scan for the prongs at predetermined intervals to allow continuous live operation only following detection of the prongs.

The socket may comprise a touch screen for programmable interaction with a user.

In an embodiment, the touch screen is disabled in the Sabbath mode.

In an embodiment, the touch screen is disabled except for predetermined emergency functions.

According to a second aspect of the present embodiments there is provided a smart building system comprising:
a network hub;
at least one environmental sensor;
at least one human activity sensor; and
at least one smart socket, the smart socket having a Sabbath mode, in which mode preset program signals at the smart socket or elsewhere on the system, and signals from the environmental sensor cause switching at the smart socket and signals of the human activity sensor are ignored and do not cause switching of the smart socket.

The smart socket may have:
an off setting;
an on setting;
a manual switch to switch manually between the off setting and the on setting;
an automatic switch mode to switch automatically between the off setting and the on setting, the automatic switching being based on time and/or on sensor input, and wherein, in the Sabbath mode, the manual switch is disabled and the automatic switching is based on time on the at least one environmental sensor, wherein the at least one smart socket is configured to enter the Sabbath mode based on Sabbaths and/or festivals using the Hebrew calendar and locally calculated daylight times.

In an embodiment, at least one environmental sensor comprises a sensor that measures an ambient light level, or a sensor that measures ambient temperature.

In an embodiment, the smart socket comprises at least one sensor that detects temperature within the socket or a temperature of a conductor within the socket, thereby to operate a cut-out to prevent overheating.

In an embodiment, the at least one human activity sensor comprises at least one member of the group of sensors comprising: a proximity sensor, a sound sensor, a voice detector, a movement sensor, a gesture detector, a face detector, a door-state detector, and a pressure sensor.

In an embodiment, signals from the at least one human activity sensor arrive at the smart socket and the Sabbath mode causes the human activity sensor signals not to cause switching.

In an embodiment, signals from at least one human activity sensor arrive at the hub and the Sabbath mode causes the hub not to pass on the human activity sensor signals.

In an embodiment, one device attached thereto is an electronic lock, the system being configured such that the electronic lock reverts to a mechanical lock in Sabbath mode.

In an embodiment, at least one of the smart sockets comprises a detector to detect whether prongs of a plug are present therein, the smart building system preventing the socket from going live unless at least two prongs are present in the socket, thus providing built in safety against electrocution.

In an embodiment, at least one of the smart sockets comprises a detector to detect whether prongs of a plug are present therein, the smart building system being operable to scan the socket for prongs at predetermined intervals and to prevent the socket from remaining live unless prongs are detected.

According to a third aspect of the present invention there is provided a smart socket comprising:
electrical terminals for insertion of prongs of a plug;
a controllable relay for connecting the terminals to an electricity supply; and
detectors for detecting whether prongs are present or absent, the smart socket having two modes of operation, a first mode in which the electricity is disconnected by the relay from the terminals unless at least two prongs are inserted into the socket, and a second mode in which the optical detectors are operated at predetermined intervals to detect whether at least two prongs are inserted into the socket and wherein the socket disconnects the electricity supply using the relay if the at least two prongs are not present.

A sensor may detect temperature within the socket or a temperature of a conductor within the socket, thereby to operate a cut-out to prevent overheating.

According to a fourth aspect of the present invention there is provided a smart building system for electronically managing devices of a building, the smart building system having a Sabbath mode. The Sabbath mode causes closure of a valve from an involuntary hot water source, thereby to cut off supply of water heated on the Sabbath.

The building, for example a hotel, may comprise separately occupied domains, such as hotel rooms for different guests. The domains may share the involuntary hot water source, and the smart building system allows independent setting of the Sabbath mode for each domain respectively, so that Sabbath observant guests may switch off their own hot water without having any effect on the other guests.

The smart building control system may include a variation of the Sabbath mode for a weekday festival, the variation leaving the valve open.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a smart plug or socket that may work with a smart control system, and, more particularly, but not exclusively, to such a device that has a Sabbath and festival day functionality.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
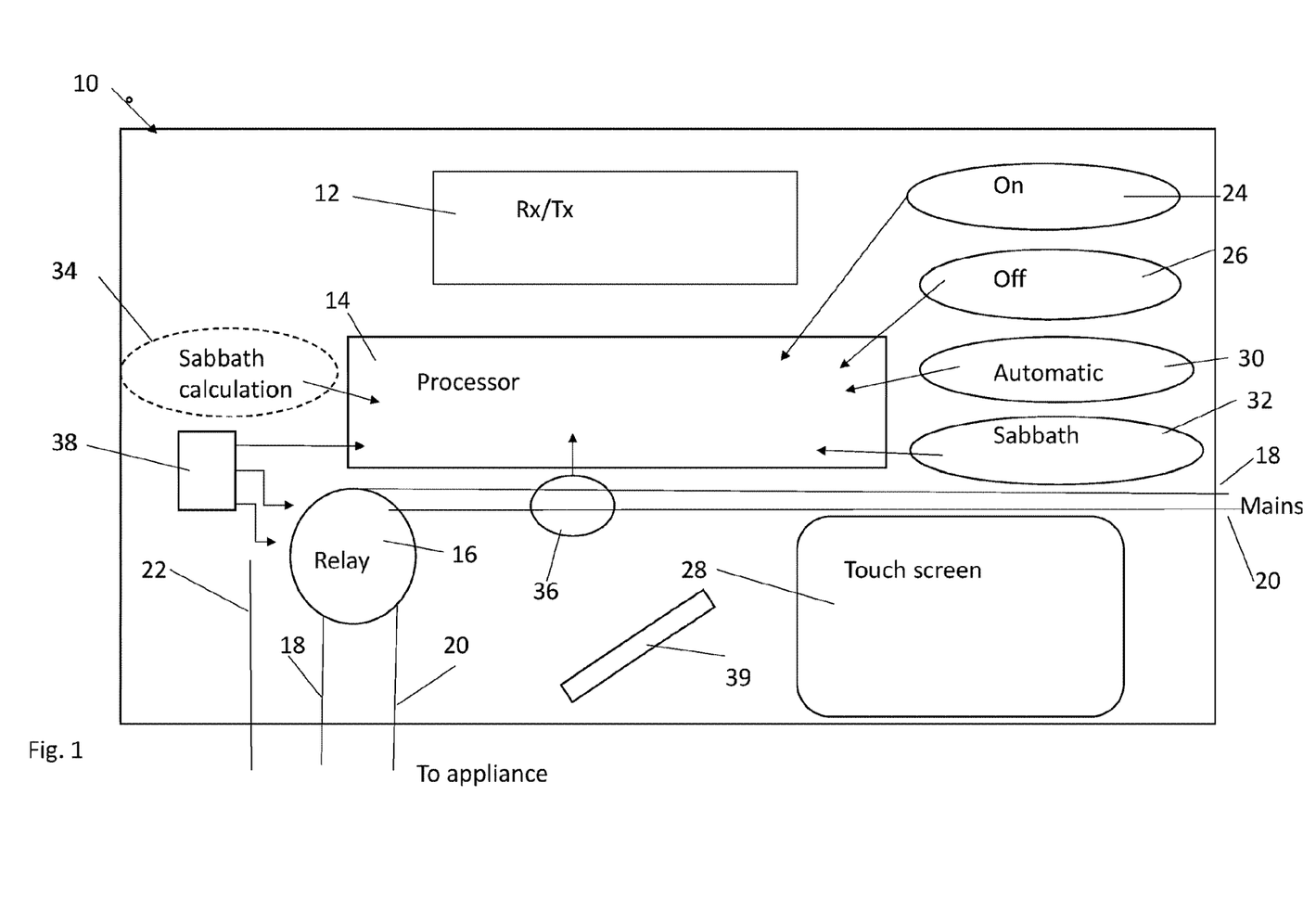
FIG. 1 is a simplified diagram showing a smart socket according to embodiments of the present invention.

Referring now to the drawings, FIG. 1 is a simplified block diagram that illustrates a smart socket with a Sabbath mode according to the present embodiments.

The smart socket 10 may include a radio transmitter receiver device 12, which may be designed to operate with any one of various local short range radio networks, which today may include WiFi, Zigbee and BlueTooth™.

A microprocessor 14 inside the socket may operate a relay 16 which is connected across the live wire 18 or across the live 18 and neutral 20 wires and either connects or disconnects any appliance attached via the socket. An earth wire 22 is typically also provided and plays no part in operation.

The relay may be set into an off setting 24 in which no voltage is applied to a connected device.

The relay may be set into an on setting 26 in which voltage is supplied to the connected device.

The processor may use manual control to set the relay between on and off modes. Manual control may be via a physical switch (not shown) or via a touch screen 28.

An automatic switching mode 30 is provided which allows the processor to switch automatically between the off setting and the on setting. In automatic mode the processor 14 may carry out switching according to an internal program or according to signals received from the network. The network may provide the socket with switching according to a program or may provide the socket with switching according to signaling over the network. Signaling over the network may involve output from a timing program elsewhere on the network or may involve sensors on the network or may involve signaling sent from an application on a remotely located mobile phone or signals received over the Internet. As will be discussed below, several kinds of sensors may be involved, and in the weekday automatic mode all of these sensors may be used.

The socket according to the present embodiments also has a Sabbath mode. In the Sabbath mode, the manual switch is disabled, except possibly for an emergency function. Automatic switching is retained and can be based on a preset program, say involving time or ambient light levels or ambient temperature levels. As before the preset program need not be on the socket but could be elsewhere on the network. A program for use with the Sabbath mode may be programmed onto the socket using touch screen 28 but this may be done prior to the entry of the Sabbath mode, as the Sabbath mode may involve disabling of the screen. In addition, signals that come from sensors that are known to depend on human presence or human action, including proximity sensors or motion sensors, or sensors of sound or gesture and the like may be ignored. That is to say, many of the sensors, particularly those that are part of the building infrastructure, continue to work in the normal way but the processor 14 ignores their input. Other sensors may actually be shut off in the Sabbath mode by disconnecting the current.

The smart socket may enter the Sabbath mode based on Sabbaths and/or festivals using the Hebrew calendar and locally calculated daylight times—using calculation unit 34. That is to say the smart socket typically knows the day of the week, the Gregorian date and the local time zone time and may calculate local daylight time to calculate Sabbath start and end times. The smart socket may further use the Hebrew calendar to calculate festival days and determine festival start and end times accordingly so that Sabbath mode is entered automatically at or before the commencement of the Sabbath or any holy day. Details of the calculations are given below in FIGS. 3 and 4. The calculations may be made on the smart socket or may be obtained over the network from a device that provides the information to any smart device on the network that requires to enter the Sabbath mode. Thus unit 34 is not necessarily located on the smart socket itself and hence is shown in hashed lines.

Thus the sensors on the network are artificially divided into those that sense ambient conditions of various kinds, and those that sense the presence or activities of humans.

Those that sense the presence or activities of humans are ignored in the switching of any device on the network that is set in Sabbath mode.

The smart socket may comprise a measurement unit 36 for measuring electric current usage by the attached appliance, for example using the Hall effect. Measurement unit 36 may give an indication of power drawn by the appliance which may be provided to the processor 14 and which information can be used in various ways. Firstly the usage information may be stored in an array to provide a usage graph. Secondly the usage information can be used to detect a device that is not drawing current and thus should be switched off. Thus chargers that have finished charging their devices may be switched off automatically.

Measurement unit 36 may also be used to detect short circuits and operate relay 16 to cut out the power in such an event. Thus in effect the socket includes its own internal fuse. However the relay is operated by a microprocessor so that the threshold current for cut-off may be set for the individual plug. The relay may be set to react faster than other cutout devices so as to work as part of a safety hierarchy.

The socket may comprise live, neutral and earth terminals as discussed. The measurement unit, or other hardware that may be provided, may be used to detect that not all terminals are engaged, and allow current flow only if two, or all three, of the terminals are engaged.

Optical detector 38 may also be provided in certain embodiments. Optical detector 38 is connected to the processor 14 and detects the presence or absence of prongs of a connecting plug. The use of the optical detector is twofold. A first use involves all modes of the smart socket. In the absence of prongs in at least two of the holes in the socket, no electricity is supplied. The relay 36 is kept in an off state. Thus the smart socket includes an automatic safety feature that prevents electrocution say in the case of children poking fingers or screwdrivers or the like into the sockets.

A second mode for using the optical detector is a separately programmable part of the Sabbath mode. The optical detector provides for a mode of operation known as grama, in which the user's actions lead only indirectly to switching on of the appliance. In grama mode, the socket is switched off by the relay for most of a cycle lasting say for a minute. For a short part of that cycle the relay switches the circuit on so that optical detector 38 may operate. At this point if there are no prongs in the socket then the relay switches off and a further cycle is entered. However, if the optical detector sees prongs in the socket then the relay is prevented from continuing the cycle and the circuit remains on. The user inserts the plug of the appliance into the socket while the socket is not live, and a small LED indicator may be used to indicate the live state, the user knowing not to insert a plug when the indicator is on. The result is that the user simply inserts the plug into an inactive socket and the socket independently detects the presence of the prongs via the optical detector and switches on the electricity. Thus the user's actions are a step removed from switching the electricity and such use is generally allowed in cases of need such as non-life threatening medical requirements. Thus to summarize, in the grama mode, as stated the socket is not live. At stated intervals, say every thirty seconds, the relay operates to activate the optical detector 38 by providing power momentarily. Then if prongs are present the relay is not reactivated, so that the socket remains live.

Thus a grama function is combined with an anti-electrocution function on a single optical detector.

In a variation, pressure sensors in the holes of the socket may replace optical detection, but the principle is the same. The socket is never live unless there are pins in at least two of the sockets, and in the grama operation of the Sabbath mode, the pressure sensors are scanned at intervals.

It is noted that in the above embodiment of the grama operation, the entire socket is live during the time that sensing is carried out. In this case, an indicator light may be used to indicate that the socket is momentarily live, so that plugs are not inserted at this point, as mentioned. In an alternative embodiment the detector 38 is operated using a small current also supplied to processor 14, and in this case the socket does not go live until pins are detected.

A temperature detector 39 may also be added to detect overheating of the socket. In general, wiring regulations define a temperature below which all electrical insulators are expected to provide safe operation, and the socket may be set to switch off automatically at a preset threshold at or below such a defined temperature. More particularly, if the conductor within the socket overheats, a feedback system may be used to manage the current and prevent the conductor from reaching dangerous temperatures. If the conductor does reach dangerous temperatures then a cutout may be applied. If the cutout is applied then an alarm may appear on the smart building controller, or on the computer, smartphone or laptop that is being used.

As well as temperature, current may be measured for dangerous levels. The socket may be rated for given maximum currents and the rated current may be programmable within reasonable and safe limits.

As mentioned, touch screen 28 may allow for programmable interaction with a user, to allow the user to set the Sabbath mode and the grama mode, and to allow the user to set timing programs in general or set the appliance to respond to particular sensors. The touch screen is disabled in the Sabbath mode, except in some embodiments for emergency functions.

Figure 2:
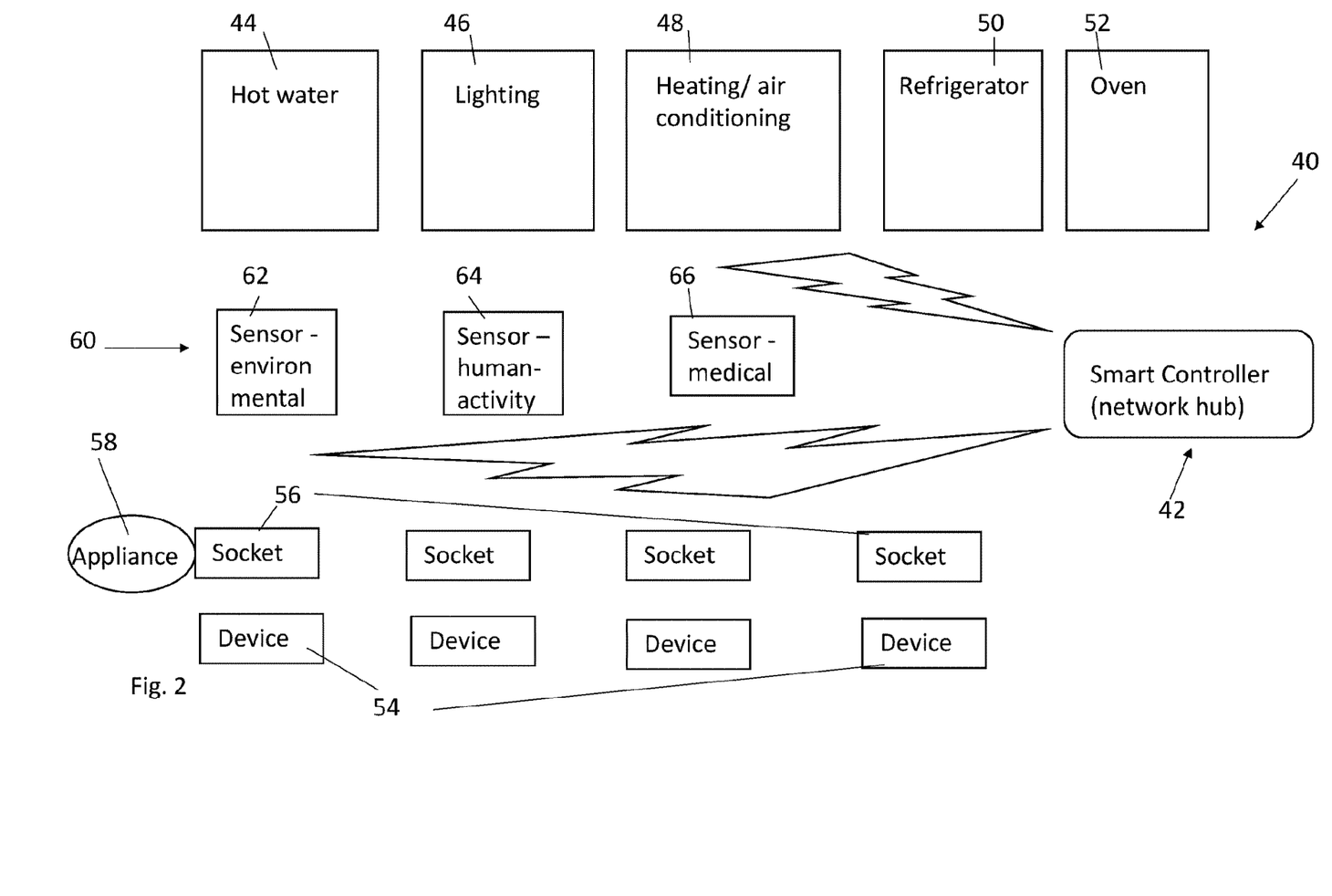
FIG. 2 is a simplified diagram showing a smart building system including a socket of the present embodiments.

Reference is now made to FIG. 2, which illustrates a smart building system 40 that includes a network hub 42 that provides a smart controller for the network. In point of fact, the network hub functionality relates to maintaining the radio network for the devices. The smart controller functionality comprises recognition of individual devices, setting up and running programs for their operation, making use of data from the devices and issuing commands and other messages to the devices. The separate functions of smart controller and network hub thus need not be combined as illustrated.

The network comprises typical fixed or semi-fixed household systems and appliances such as the hot water system 44, the lighting system 46, heating and/or air conditioning 48, refrigeration 50, and oven 52. The list of household appliances is not intended to be exhaustive. Other devices 54 may be connected to the network hub, some on a permanent basis, some on an ad-hoc basis. For direct connection, the devices require at least a receiver for the network signals, if not a transmitter, and a processor for smart processing.

Smart sockets 56 as described in respect of FIG. 1, and variations thereof, form part of the smart system and non-smart appliances 58 may be plugged into the sockets, so that switching through the sockets allows these non-smart appliances to be part of the smart system. Hence say a completely standard night-light can be plugged into a smart socket and be set to light up whenever ambient light levels are low, hence becoming a smart device.

The network also has sensors 60. According to the present embodiments, these sensors may be divided into categories according to their functionality. Thus some sensors 62 may sense environmental factors that have nothing to do with human activity. For example they may sense ambient light levels or ambient temperature. Other sensors may be categorized as human activity sensors 64 if what they sense may relate to conscious activity of a human being. Such sensors may include a proximity sensor, a sound sensor, a voice detector, a movement sensor, a gesture detector, a face detector, a door-state detector which tells you whether a door has been opened, and a pressure sensor say that detects a human pressing on a surface or standing on a spot on the floor.

For the purposes of the present embodiments, it is to be noted that medical sensors 66, say that sense heart rate or other features of human metabolism, or even fall sensors for the elderly, are not sensing conscious activity and are regarded as environmental sensors, insofar as their activity is connected to the smart sockets and to the smart building system. In any event, their activity is not suppressed by the Sabbath mode.

In accordance with the present embodiments, signals from the environmental sensors on the network may be allowed to cause switching at the smart sockets and other appliances. Signals from the human activity sensors may still be received at the smart sockets but in the Sabbath mode are ignored. In other embodiments, the entire smart controller system recognizes the Sabbath mode, and signals from the human activity sensors are received by the network hub but are not passed on to the downstream devices and/or smart sockets.

In a hotel environment, where some guests may be Sabbath observers and some not, the smart controller typically passes on all the signals. The Sabbath observers then switch their own sockets onto Sabbath mode, or this can be done for them at the front desk, and there is no effect on the other guests whose rooms continue to operate normally.

One of the devices frequently used in a hotel is an electronic door lock. In the Sabbath mode, the door lock may be set by the smart system to cancel electronic operation and revert to a mechanical lock. The electronic lock may be attached to a smart socket according to the present embodiments or may be connected to the smart network directly as an independent device.

The following discusses the calculation of the times and the dates.

The Hebrew calendar is neither a solar calendar like the Gregorian calendar, nor a lunar calendar like the Moslem calendar, but is a hybrid lunar-solar calendar, which makes its calculation far from trivial.

The following is a discussion about how to calculate the Hebrew calendar.

The Jewish calendar combines three unconnected astronomical phenomena: the rotation of the Earth about its axis, the day; the revolution of the moon about the Earth, the month; and the revolution of the Earth about the sun, the year. These three phenomena are independent of each other, and there is no correlation between them. The moon revolves around the Earth in about 29½ days. The Earth revolves around the sun in about 365¼ days, that is, about 12 lunar months and 11 days.

To coordinate between the above three phenomena, the Jewish calendar consists of 12 or 13 months of 29 or 30 days, and can be 353, 354, 355, 383, 384 or 385 days long. The centerpiece of the calendar is the new moon, referred to in Hebrew as the Molad. A new month on the Jewish calendar begins with the Molad. The Molad for the month of Tishri is the most important one for calendar calculations, and is referred to as Molad Tishri.

Note that the calculated Molad does not correspond precisely to the astronomical new moon. The length of time from one astronomical new moon to the next varies somewhat because of the eccentric orbits of the Earth and Moon; however, the calendar Molad is set using a fixed average length of time: 29 days, 12 hours, and 793 parts, commonly written in an abbreviated form: 29 d 12 h 793 p, where the part, or chelek, is a unit of time equal to 3⅓ seconds. There are 18 parts in a minute and 1,080 parts in an hour.

The time for the Molad is Jerusalem local time, which is not the same as the time on the clock, even in Jerusalem, since clocks use the time zone time, not the local time.

Figure 3:
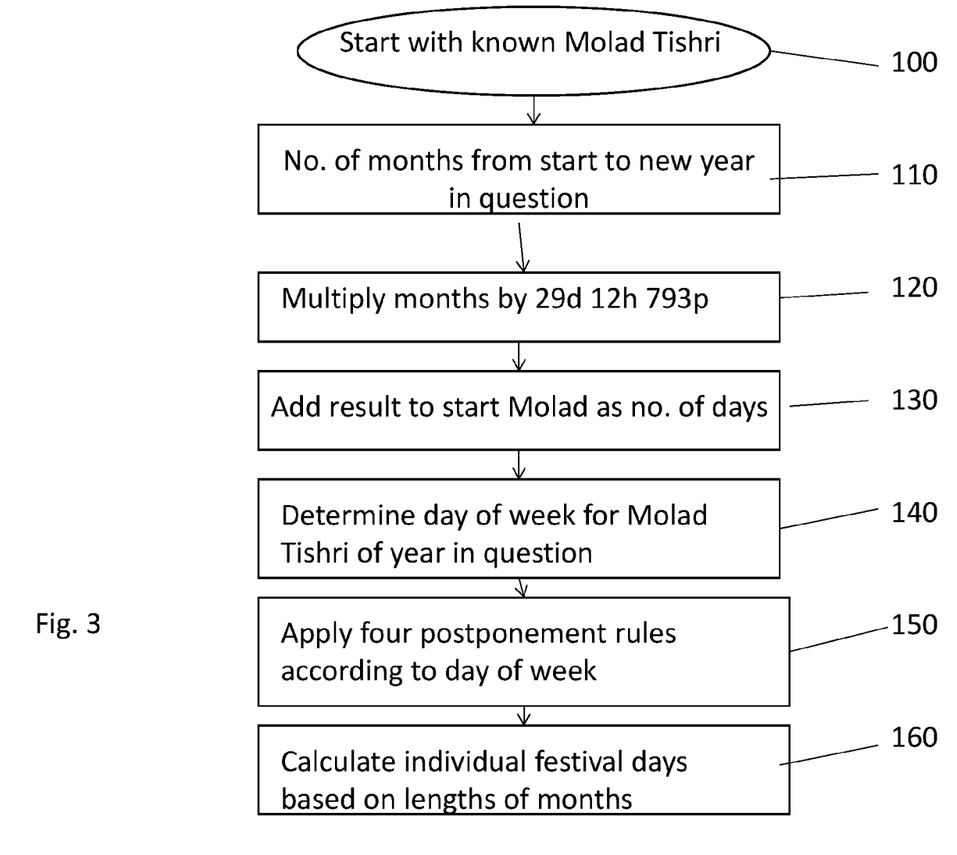
FIG. 3 is a simplified flow chart illustrating a process of calculating the Hebrew calendar for use with the present embodiments.

Reference is now made to FIG. 3, which shows the stages involved in calculating the date of the New Year—Rosh Hashanah on the Jewish calendar:

The calculation begins with box 100, taking a known Molad Tishri, the day of the week and the corresponding date in the Gregorian calendar.

In box 110 the calculation determines the number of months between the known Molad and Molad Tishri of the year of interest.

In box 120 the number of months is multiplied by the length of the Molad interval: 29 d 12 h 793 p to give a number of days and fractions of a day.

The result is then added to the known starting Molad as a number of days—box 130.

In box 140 the number of days modulo seven added to the start day of the week gives the day of the week of the Molad Tishri.

In box 150 the four postponement rules are used to determine the actual date to be used for the New Year—Rosh Hashanah for the current year.

In box 160, the secular date is obtained by adding the number of days elapsed, calculated in box 120, to the secular starting date and correcting for intervening leap years.

Box 110 in greater detail requires to determine how many months are between the starting point used and Tishri of the year of your end point. There are exactly 235 months in every 19-year cycle of leap years (12 12-month years plus 7 13-month years), but if the number of years is not evenly divisible by 19, then it is necessary to determine whether each remaining year is a regular year (12 months) or a leap year (13 months).

The leap year cycle is calculated as follows. Leap years occur in years 3, 6, 8, 11, 14, 17 and 19 of a 19-year cycle, and the 19-year cycle begins in the year 1, so you can simply divide the year number by 19 and examine the remainder. If the remainder is 3, 6, 8, 11, 14, 17 or 0 (the 19th year of the cycle) then the year is a leap year. Otherwise, it is not.

In box 120, we multiply the number of months by the average length of the Molad, which is 29 d 12 h 793p:

Box 130 requires adding the elapsed time calculated above to the starting date to get the ending date.

At this point, we note the number of days elapsed between our starting point and our ending point as a number of days. We note this at this point in the calculation, after the hours are rounded into the days but before the weekday of the starting Molad is added to the number of days. This number of days will be necessary to determine the Gregorian date in box 160.

Box 150 involves applying what are known as postponements or dechiyot, which are needed to find the correct days on which the festivals occur. There are four rules of postponement which postpone the date of Rosh Hashanah, but do not affect the calculated time of the Molad. One of the postponements is a general rule of rounding to ensure the year has a whole number of days, while the rest are designed to prevent oddities in the length of the year and the date of Rosh Hashanah.

Postponement 1: Molad Zakein—General Rounding Rule.

The first postponement is Molad zakein, meaning an "old" Molad. If the Molad occurs at or after noon, the Molad is considered to be "old" and we round to the next day. This rule is quite commonly applied, affecting a quarter of all years.

The rule of Molad zakein simply means that a Molad at or after noon relates to the day that starts at the next sunset, 4-10 hours later, rather than the previous sunset which was 14-20 hours earlier.

Note that when postponements like this apply, a day must be added to the elapsed time for purposes of calculating the Gregorian equivalent date, but the Molad does not change. The unchanged Molad is used for purposes of calculating subsequent years and for certain religious purposes.

Postponement 2: Lo A"DU Rosh

The second postponement is known as Lo A"DU or Lo A"DU Rosh. This rule states that Rosh Hashanah cannot occur on a Sunday, a Wednesday or a Friday. If the calculated Molad occurs on one of these days of the week, Rosh Hashanah is postponed by a day to prevent other problems with the calendar.

This postponement is also commonly applied, as you might imagine. It applies to three out of seven days, so one would expect it to occur almost half of the time.

Note that the postponements of Molad zakein and Lo A"DU Rosh can work in combination. Thus the rule of Molad Zakein must be checked before the rule of Lo A"DU Rosh.

Postponement 3: Gatarad

The remaining two dechiyot are much less commonly applied.

Postponement Gatarad holds that if Molad Tishri in a simple 12-month, non-leap, year occurs on a Tuesday at 9 h 204 p or later, Rosh Hashanah is postponed to the next day, a Wednesday, which by the effect of Lo A"DU Rosh would then be postponed to Thursday.

Why does such a complicated rule exist? This rule prevents the possibility that a year might be 356 days, an invalid length. Consider: a Molad Tishri at 3 d 9 h 204 p would not be postponed by Molad Zakein or Lo A"DU Rosh. Add 12 lunar cycles (354 d 8 h 876p) to the next year's Rosh Hashanah and you get 7 d 18 h 0 p with 354 days elapsed. Molad Zakein applies to the following year, postponing Rosh Hashanah to the next day, a Sunday, with 355 days elapsed. Lo A"DU Rosh is then triggered, postponing Rosh Hashanah and leaving 356 days elapsed and making the current year an invalid length. Gatarad takes days away from the following year and adds them to the preceding year, so both years are a valid length.

Note that Gatarad invariably triggers Lo A"DU Rosh. Gatarad only applies when Rosh Hashanah is Tuesday and Gatarad postpones Rosh Hashanah to Wednesday. Lo A"DU Rosh then postpones Rosh Hashanah to Thursday.

Note also that this rule is not combined with Molad Zakein. If Molad Zakein applies to the current year, Gatarad is unnecessary; thus Gatarad applies only to Molads between 9 h 204 p and 17 h 1079p.

Postponement 4: Betutkafot

Like Postponement Gatarad, this rule is not very commonly applied and is also designed to prevent a year from having an invalid length. Postponement Betutkafot prevents a leap-year from having 382 days, too few days, by postponing Rosh Hashanah of the non-leap year following the leap year.

If Molad Tishri in a year following a leap year occurs on Monday after the 15th hour and 589 parts, then it is postponed to the next day. The rule is applied only if the actual Molad occurs on Monday, not if it is postponed to Monday. Like Gatarad, the rule really only applies to Molads before noon, because Molad Zakein handles the postponements for Molads at or after noon. Unlike Gatarad, Betutkafot does not trigger Lo A"DU Rosh, because Betutkafot postpones Rosh Hashanah from a Monday to a Tuesday and Tuesday is an acceptable day for Rosh Hashanah.

Microprocessors are typically programmed with the Gregorian date, so a final stage is to determine the Gregorian date, at least for a starting point. Typically, one would calculate the Gregorian date for Rosh Hashanah and work from there. One may take the elapsed days calculated in Step 4, add any additional days triggered by the postponements in Step 5, and add this number of days to the date of Rosh Hashanah for the known Molad.

The principles above are sufficient to convert Rosh Hashanah to a Gregorian date for any year. However, for the remaining festivals, one may calculate either that year's Rosh Hashanah, the following year's Rosh Hashanah or both and use this information to work out the date based on the lengths of months. Additional information relates to the month of the festival being considered.

The following contains information for all of the months, irrespective of whether festivals are involved.

Tishri

Tishri is the month of Rosh Hashanah, so you simply add the date of the month to Rosh Hashanah and subtract 1 (because Rosh Hashanah is Day 1).

Cheshvan

Cheshvan is the second month of the calendar year, and the preceding month of Tishri is always 30 days, so you simply take the current Rosh Hashanah, add 29 days (30-1 for Rosh Hashanah) and add the date of the month.

Kislev

Kislev is the hardest month to calculate. You cannot simply work forward from the current year's Rosh Hashanah, because the preceding month of Cheshvan can be 29 or 30 days, nor can you work backward from the next year's Rosh Hashanah, because Kislev itself can also be 29 or 30 days. To calculate the length of Kislev, you need to know the date of Rosh Hashanah of both the current year and the next year, then calculate the difference between them to determine the length of the current year. If the year is 353, 354, 383 or 384 days, then Cheshvan is 29 days and you can determine a date in Kislev taking the current Rosh Hashanah, adding 58 days, then adding the date of the month. If the year is 355 or 385 days, then Cheshvan is 30 days and you can determine a date in Kislev by taking the current Rosh Hashanah, adding 59 days, then adding the date of the month.

Tevet, Shevat

The remaining months of the year are of unchanging length, but the number of months varies depending on whether the year is a leap year! Tevet and Shevat are best calculated by working backwards from the following year's Rosh Hashanah and subtracting an additional 30 days in a leap year. Tevet's offset in a non-leap year is −266; Shevat's is −237.

Adar, Adar I and Adar II

Adar is always offset −207 from the following Rosh Hashanah; however, in regular years, Adar is the 12th month of the year (starting from Nissan), and in leap years, is known as Adar II and is the 13th month of the year. Adar I, the extra month inserted as the 12th month in leap years, is always offset −237 days from Rosh Hashanah.

Nissan, Iyar, Sivan, Tammuz, Av, Elul

The remaining months of the year are all of unchanging length and not affected by leap years. Simply subtract the appropriate number of days from the following year's Rosh Hashanah and add the date of the month.

Figure 4:
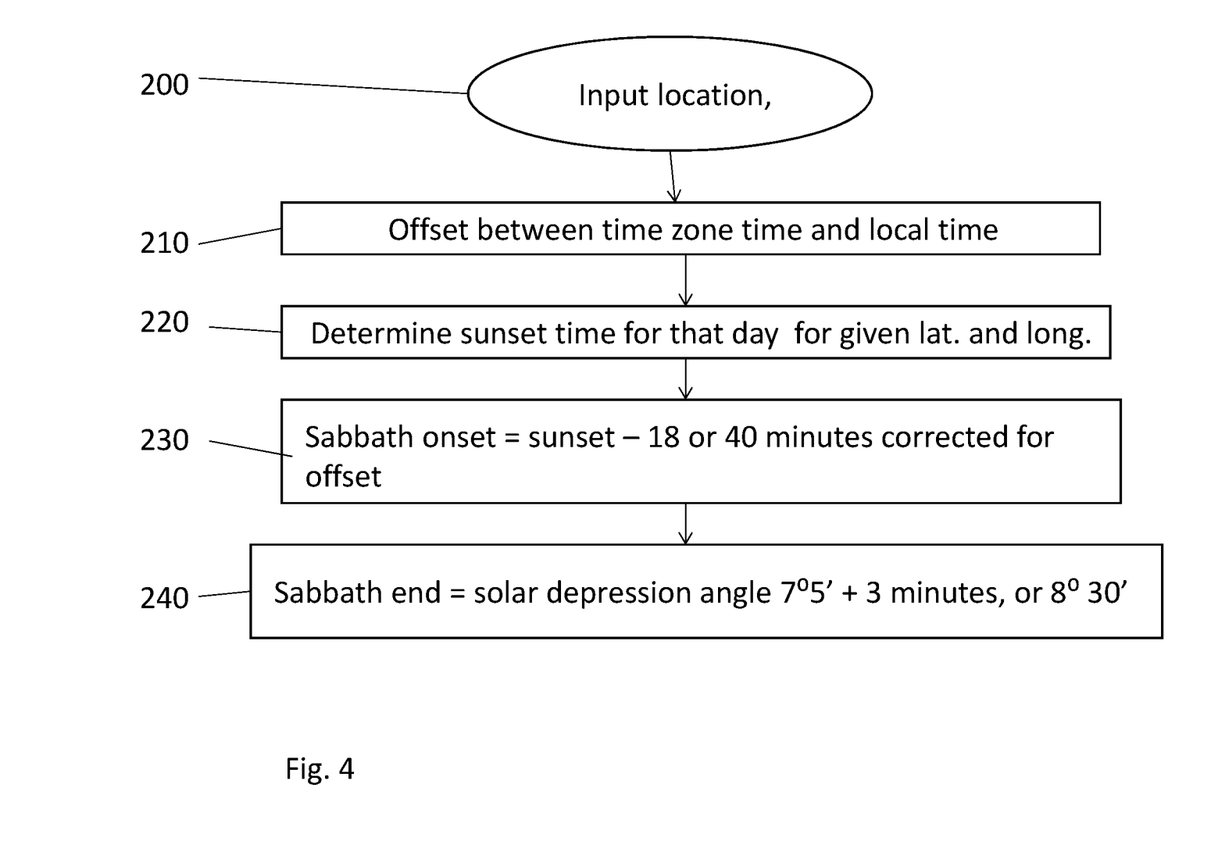
FIG. 4 is a simplified flow chart illustrating calculation of local Sabbath onset times on a given day at a given location.

Reference is now made to FIG. 4, which illustrates calculation of Shabbat onset times requires longitude and latitude at the location in question. Local time at any given location is an offset of the time zone time being observed which can be obtained using the longitude and latitude, provided in box 200. Published sunset times are not likely to be for either the given location or based on the local time and so cannot be used. Instead an offset is calculated between clock time and actual local time, box 210, and actual sunset times for the given location are calculated in terms of local time—box 220—and then may be converted into the clock time using the offset. The Sabbath onset time is for most locations 18 minutes prior to the local sunset time. In Jerusalem, the Sabbath onset time is 40 minutes prior to the local sunset time—box 230.

The Sabbath ending time is based on a definition of nightfall that depends on the depression angle of the sun below the horizon. Some authorities use a solar depression angle of seven degrees and five minutes, and then add three minutes to the resulting time. Other authorities use a solar depression angle of eight and a half degrees with no time added—box 240.

In practice tables are available of the calendar and of Sabbath times, and numerous programs are available for calculating either. The microprocessor however needs to know the local coordinates and the time according to the local time zone in order to obtain the correct answers.

Figure 5:
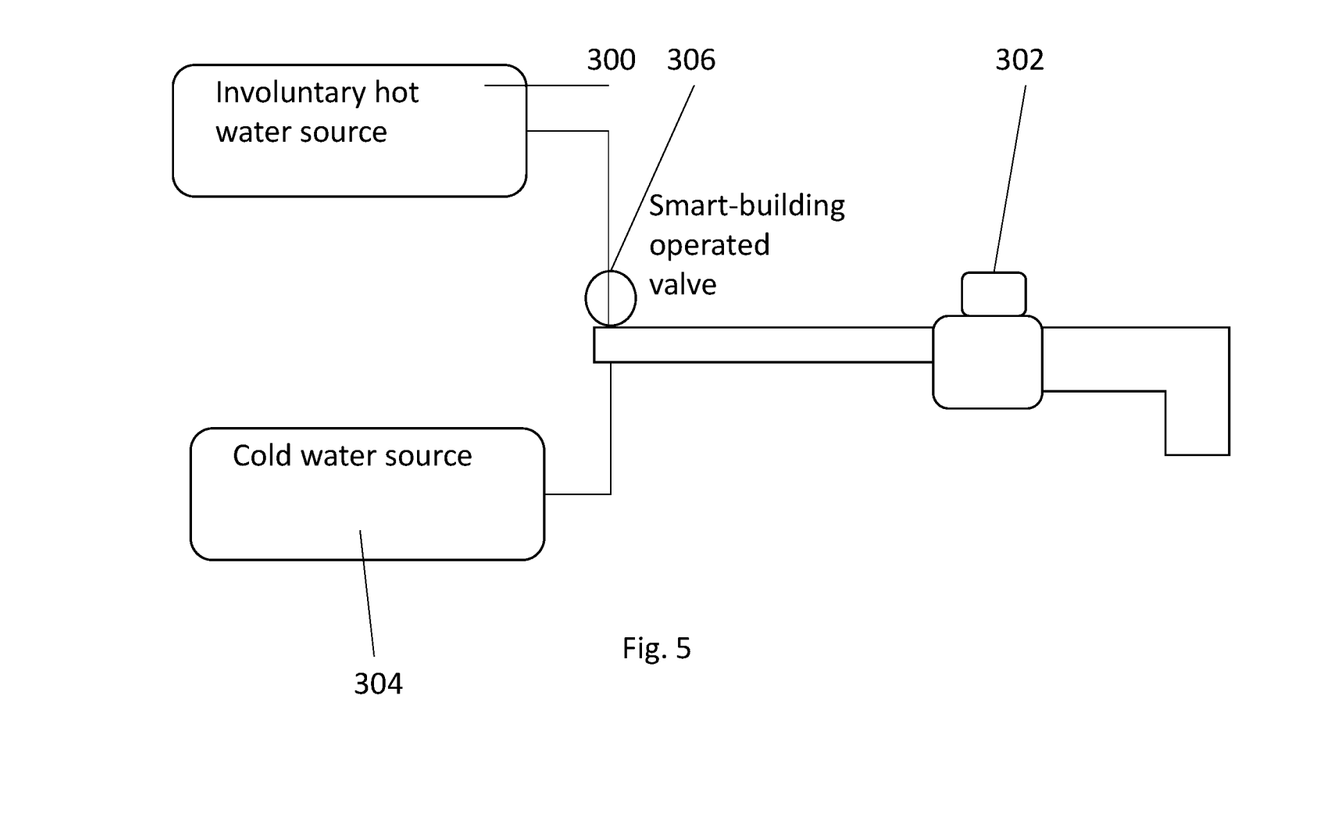
FIG. 5 provides a smart home solution for an involuntary hot water source according to embodiments of the present invention.

Reference is now made to FIG. 5 which is a simplified diagram illustrating a further embodiment of the present invention in which a smart home or smart building solution is provided for the issue of involuntarily heated water. As mentioned, water that is heated ab initio on the Sabbath is not allowed to be used. Now, in a hotel setting there may be centralized heating of water which the individual guest is unable to do anything about. In addition, many buildings have solar heating or solar assisted heating to provide hot water. Some authorities allow solar heated water. Others allow it only under certain conditions and some do not allow it at all. In the past there was a simple solution. Those concerned simply did not use the hot tap. However, nowadays many premises have a single hot and cold faucet which provides both hot and cold water in different mixtures depending on the position of a lever. Furthermore the faucets age so that there is no guarantee over the lifetime of the faucet that any position of the lever actually provides pure cold water with no admixture of hot.

The present embodiments thus cater for such an involuntary hot water source 300. Faucet 302 is fed from involuntary hot water source 300 and from cold water source 304. A smart building operated valve 306 is set on the hot water line and when the smart building system is in Sabbath mode the valve prevents water from the involuntary hot water source 300 reaching faucet 302. In embodiments the valve is operated when in the Sabbath mode, but is not operated on a weekday festival, when heating of water is allowed.

The embodiment is particularly useful in a hotel or guesthouse, where some guests may be Sabbath observant and others not. The hotel may operate a central water heating system and each guest has the option to set the Sabbath mode for his/her own room or domain as desired.

It is expected that during the life of a patent maturing from this application many relevant short range radio network protocols, smart networks, optical detectors, processor and smart devices including sockets and plugs will be developed and the scopes of the corresponding terms as used herein are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A smart socket for engaging prongs of an electrical plug to connect one or more electrical devices via said smart socket to a mains electricity supply, the smart socket comprising:
   at least live and neutral socket terminals configured to reversibly engage live and neutral prongs of the electrical plug, thereby to connect the device to the mains electricity supply;
   an off setting;
   an on setting;
   a manual switch to switch manually between said off setting and said on setting;

an automatic switch mode to switch automatically between said off setting and said on setting, said automatic switching being based on time and/or on sensor input;

a Sabbath mode, wherein said manual switch is disabled and said automatic switching is based on time or on a predetermined set of sensors, wherein said smart socket is configured to enter said Sabbath mode based on Sabbaths and/or festivals using the Hebrew calendar and locally calculated daylight times, wherein said predetermined set of sensors for said Sabbath mode comprises sensors of environmental conditions and excludes sensors that detect human motion or action.

2. The smart socket of claim 1, further comprising a radio transmitter/receiver for a short range radio network.

3. A smart socket for engaging prongs of an electrical plug to connect one or more electrical devices via said smart socket to a mains electricity supply, the smart socket comprising:

at least live and neutral socket terminals configured to reversibly engage live and neutral prongs of the electrical plug, thereby to connect the device to the mains electricity supply;

an off setting;

an on setting;

a manual switch to switch manually between said off setting and said on setting;

an automatic switch mode to switch automatically between said off setting and said on setting, said automatic switching being based on time and/or on sensor input;

a Sabbath mode, wherein said manual switch is disabled and said automatic switching is based on time or on a predetermined set of sensors, wherein said smart socket is configured to enter said Sabbath mode based on Sabbaths and/or festivals using the Hebrew calendar and locally calculated daylight times; and, a temperature sensor for sensing temperature within said socket, or of a temperature of a conductor within said socket, thereby to govern temperature within said socket and prevent overheating.

4. The smart socket of claim 3, having a first temperature threshold, and a feedback circuit for controlling the current within said plug when said first temperature threshold is exceeded.

5. The smart socket of claim 3, having a second temperature threshold, and a cutout for disconnecting current within said socket when said second temperature threshold is exceeded.

6. A smart socket for engaging prongs of an electrical plug to connect one or more electrical devices via said smart socket to a mains electricity supply, the smart socket comprising:

at least live and neutral socket terminals configured to reversibly engage live and neutral prongs of the electrical plug, thereby to connect the device to the mains electricity supply;

an off setting;

an on setting;

a manual switch to switch manually between said off setting and said on setting;

an automatic switch mode to switch automatically between said off setting and said on setting, said automatic switching being based on time and/or on sensor input; a Sabbath mode, wherein said manual switch is disabled and said automatic switching is based on time or on a predetermined set of sensors, wherein said smart socket is configured to enter said Sabbath mode based on Sabbaths and/or festivals using the Hebrew calendar and locally calculated daylight times; and a measurement unit for measuring electric current usage.

7. The smart socket of claim 6, configured to switch off devices not drawing current as detected by said measurement unit.

8. The smart socket of claim 6, further comprising a programmable current threshold and a cutoff for disconnecting when said measured electric current usage exceeds said threshold.

9. The smart socket of claim 6, comprising live, neutral and earth terminals and further comprising optical detectors to detect a presence of said prongs of the plug to engage said terminals, the smart socket being configured to use said optical detectors to allow current flow only if at least two of said terminals are engaged.

10. The smart socket of claim 9, further comprising an earth terminal, and configured to allow current flow only if all three of said terminals are engaged.

11. The smart socket of claim 9, configured to provide a scanning operation within said Sabbath mode wherein said optical detectors scan for said prongs at predetermined intervals to allow continuous live operation only following detection of said prongs.

12. A smart socket for engaging prongs of an electrical plug to connect one or more electrical devices via said smart socket to a mains electricity supply, the smart socket comprising:

at least live and neutral socket terminals configured to reversibly engage live and neutral prongs of the electrical plug, thereby to connect the device to the mains electricity supply;

an off setting;

an on setting;

a manual switch to switch manually between said off setting and said on setting;

an automatic switch mode to switch automatically between said off setting and said on setting, said automatic switching being based on time and/or on sensor input; a Sabbath mode, wherein said manual switch is disabled and said automatic switching is based on time or on a predetermined set of sensors, wherein said smart socket is configured to enter said Sabbath mode based on Sabbaths and/or festivals using the Hebrew calendar and locally calculated daylight times; and a touch screen for programmable interaction between said socket and a user.

13. The smart socket of claim 12, wherein the touch screen is disabled in the Sabbath mode, or wherein the touch screen is disabled in the Sabbath mode except for predetermined emergency functions.

14. A smart building system comprising:

a network hub;

at least one environmental sensor;

at least one human activity sensor; and at least one smart socket, the smart socket configured to engage prongs of an electrical plug to connect one or more electrical devices via said smart socket to a mains electricity supply, the smart socket comprising at least live and neutral socket terminals configured to reversibly engage live and neutral prongs of the electrical plug, thereby to connect the device to the mains electricity supply;

the smart socket having a Sabbath mode, in which mode preset program signals at said smart socket or elsewhere on said system, and signals from said environmental sensor cause switching at said smart socket and signals of said human activity sensor are ignored and do not cause switching of said smart socket.

15. The smart building system of claim 14, wherein said at least one smart socket comprises:

an off setting;

an on setting;

a manual switch to switch manually between said off setting and said on setting;

an automatic switch mode to switch automatically between said off setting and said on setting, said automatic switching being based on time and/or on sensor input, and wherein, in said Sabbath mode, said manual switch is disabled and said automatic switching is based on time on said at least one environmental sensor, wherein said at least one smart socket is configured to enter said Sabbath mode based on Sabbaths and/or festivals using the Hebrew calendar and locally calculated daylight times.

16. The smart building system of claim 15, wherein said at least one environmental sensor comprises a sensor that measures an ambient light level, or a sensor that measures ambient temperature.

17. The smart building system of claim 15, wherein said smart socket comprises at least one sensor that detects temperature within said socket or a temperature of a conductor within said socket, thereby to operate a cut-out to prevent overheating.

18. The smart building system of claim 14, wherein said at least one human activity sensor comprises at least one member of the group of sensors comprising: a proximity sensor, a sound sensor, a voice detector, a movement sensor, a gesture detector, a face detector, a door-state detector, and a pressure sensor.

19. The smart building system of claim 14, wherein signals from said at least one human activity sensor arrive at said smart socket and said Sabbath mode causes said human activity sensor signals not to cause switching.

20. The smart building system of claim 14, wherein signals from at least one human activity sensor arrive at said hub and said Sabbath mode causes said hub not to pass on said human activity sensor signals.

21. The smart building system of claim 14, wherein one device attached thereto is an electronic lock, the system being configured such that the electronic lock reverts to a mechanical lock in Sabbath mode.

22. The smart building system of claim 14, wherein at least one of said smart sockets comprises a detector to detect whether said prongs of the plug are present therein, the smart building system being operable to prevent said socket from going live unless at least two prongs are present in said socket, and/or wherein at least one of said smart sockets comprises a detector to detect whether said prongs of the plug are present therein, the smart building system being operable to scan said socket for prongs at predetermined intervals and to prevent said socket from remaining live unless said prongs are detected.

* * * * *